US011645040B2

(12) United States Patent
Iwase et al.

(10) Patent No.: US 11,645,040 B2
(45) Date of Patent: May 9, 2023

(54) TEXT FILE BINARY SEARCH DEVICE, SEARCH METHOD, PROGRAM, AND INFORMATION RECORDING MEDIUM

(71) Applicant: Rakuten Group, Inc., Tokyo (JP)

(72) Inventors: Hiroaki Iwase, Tokyo (JP); Junji Torii, Tatebayashi (JP)

(73) Assignee: Rakuten Group, Inc., Tokyo (JP)

( * ) Notice: Subject to any disclaimer, the term of this patent is extended or adjusted under 35 U.S.C. 154(b) by 244 days.

(21) Appl. No.: 16/334,862

(22) PCT Filed: Sep. 20, 2016

(86) PCT No.: PCT/JP2016/077742
§ 371 (c)(1),
(2) Date: Mar. 20, 2019

(87) PCT Pub. No.: WO2018/055680
PCT Pub. Date: Mar. 29, 2018

(65) Prior Publication Data
US 2020/0026491 A1 Jan. 23, 2020

(51) Int. Cl.
*G06F 7/02* (2006.01)
(52) U.S. Cl.
CPC .......... *G06F 7/02* (2013.01); *G06F 2207/025* (2013.01)
(58) Field of Classification Search
CPC . G06F 7/02; G06F 2207/025; G06F 16/24554
See application file for complete search history.

(56) References Cited

U.S. PATENT DOCUMENTS

| 7,512,610 B1* | 3/2009 | Barabas | G06F 16/10 |
| 7,895,167 B2* | 2/2011 | Berg | G06F 11/0784 707/672 |
| 2012/0078925 A1* | 3/2012 | Behar | G06F 16/3341 707/755 |

(Continued)

FOREIGN PATENT DOCUMENTS

JP 8-272827 A 10/1996

OTHER PUBLICATIONS

Happy, S., binary search of a sorted text file, http://blog.sarah-happy.ca/2010/04/binary-search-of-sorted-text-file.html, Apr. 24, 2010, 5 pp. (Year: 2010).*

(Continued)

*Primary Examiner* — Marc S Somers
(74) *Attorney, Agent, or Firm* — Sughrue Mion, PLLC (57) ABSTRACT

A device searches a file being recorded that includes lines sorted in accordance with keys included in the lines to find a line that matches a pattern. When the device receives a pattern, it initializes upper and lower limits of a search range and calculates a middle position between the limits. It acquires, from the file, a middle line that starts at or before the middle position and ends after it. If the key included in the middle line matches the pattern, it outputs the middle line and re-sets the upper or lower limit based on whether the key included in the middle line is greater or less than the pattern and, if there is a distance greater than a length of a newline between the limits, repeats the procedure starting from the middle position. Otherwise, it outputs a result to the effect that no matching line has been found.

8 Claims, 5 Drawing Sheets

(56) References Cited

U.S. PATENT DOCUMENTS

2017/0228407 A1* 8/2017 Mano .................... G06F 16/221

OTHER PUBLICATIONS

Péter Szabó, "Evolution of a binary search implementation for line-sorted text files", Aug. 23, 2016, pp. 1-13 (13 pages total).
"Binary search algorithm", Wikipedia, [online], [retrieved on Feb. 25, 2016], https://en.wikipedia.org/wiki/Binary_search_algorithm, 5 pages.
International Search Report for PCT/JP2016/077742, dated Nov. 8, 2016, 1 pp.

\* cited by examiner

TEXT FILE BINARY SEARCH DEVICE, SEARCH METHOD, PROGRAM, AND INFORMATION RECORDING MEDIUM

CROSS REFERENCE TO RELATED APPLICATIONS

This Application is a National Stage of International Application No. PCT/JP2016/077742 filed Sep. 20, 2016.

TECHNICAL FIELD

The present disclosure relates to a search device, a search method, a program, and an information recording medium for performing a binary search on a text file.

BACKGROUND ART

Conventionally, binary search techniques for fast search on a sorted array for a desired element have been proposed (see Non Patent Literature 1). The binary search described therein assumes that a searched array contains elements that are of equal data size.

Patent Literature 1 discloses a technique for generating a binary tree from text data in advance for the purpose of performing a binary search on the text data.

CITATION LIST

Patent Literature

Patent Literature 1: Unexamined Japanese Patent Application Kokai Publication No. H08-272827

Non Patent Literature

Non Patent Literature 1: Article on "Binary search algorithm," [online], [retrieved on Feb. 25, 2016], Wikipedia

SUMMARY OF INVENTION

Technical Problem

However, when a search is conducted on a text file that contains lines having any lengths in order to find a line containing a key that matches a desired pattern, each data piece is represented by a line, and thus the data pieces are not of equal data size.

In addition, when the search is performed on, for example, a log file in which data is frequently added and updated or on a large-size text file, generating binary trees may often be difficult indeed.

Hence, there is a demand for a technique for performing a binary search on a text file that contains a plurality of lines to find a line containing a key that matches a desired pattern.

The present disclosure is intended to solve these problems, and an objective of the disclosure is to provide a search device, a search method, a program, and an information recording medium for performing a binary search on a text file.

Solution to Problem

A search device according to an aspect of the present disclosure is configured to:

refer to a recorder recording a text file that includes an array of a plurality of lines sorted in an order of keys, each of the keys being included in each of the plurality of lines, each of the lines including a newline placed at an end of the line;

receive a pattern for performing a search;

set a head position and an end position of the text file to a lower limit and an upper limit of a search range;

make calculation of a middle position between the lower limit and the upper limit;

make acquisition of, from the text file recorded in the recorder, a middle line that:

(x) starts at or before the calculated middle position; and (y) ends after the calculated middle position;

output, when a key included in the acquired middle line matches the received pattern, the acquired middle line as a result of the search;

(p) re-set the head position of the middle line to the lower limit when the key included in the acquired middle line is greater than the received pattern;

(q) re-set the end position of the middle line to the upper limit when the key included in the acquired middle line is less than the received pattern;

repeat the calculation and the acquisition when the position shifted backward from the upper limit by a length of one newline comes before the lower limit; and output, if the position shifted backward from the upper limit by the length of one newline does not come before the lower limit, a result of the search to an effect that a line matching the received pattern is not found.

Advantageous Effects of Invention

The present disclosure achieves providing a search device, a search method, a program, and an information recording medium for performing a binary search on a text file.

DESCRIPTION OF EMBODIMENTS

Embodiments of the present disclosure will now be described. The embodiments are presented for explanatory purposes only and do not limit the scope of the present disclosure. Therefore, persons skilled in the art can adopt embodiments in which any or all of the elements in the following embodiments are replaced with equivalents thereof, and such adopted embodiments are included in the scope of the present disclosure.

Example 1

A search device according to the present embodiment is implemented by executing a program, the program execution being carried out by a computer prepared for its intended applications.

The program can be distributed from a distribution server operated by a provider who sells or otherwise provides the program via a transitory transmission medium such as a computer communication network. For example, the program can be distributed from a Web server or the like via the Internet or the like.

The program can be recorded in a non-transitory computer-readable information recording medium such as a compact disc, a flexible disk, a hard disk, a magneto-optical disk, a digital video disk, a magnetic tape, read-only memory (ROM), electrically erasable programmable ROM (EEPROM), flash memory, or semiconductor memory. Such an information recording medium can also be distributed or sold independently of computers.

After distributed, the program is recorded in a non-transitory information recording medium such as flash memory or a hard disk for the computer to which the program has been downloaded.

A central processing unit (CPU) or processor in the computer reads the non-transitorily recorded program into a memory such as random-access memory (RAM), which is a temporary storage device, and then executes a code in the program.

However, the CPU directly reads and executes an instruction included in the program that is stored in ROM, a hard disk, or the like, in an architecture where the instruction can be executed by mapping ROM and RAM to a single memory space or in an environment where a file recorded in a hard disk or any other information recording medium can be mapped to the memory space by using a system call.

Various variables to be used in the below-mentioned processes are implemented by reading and writing values from and to the RAM or a register provided in the processor or CPU.

Instead of using a computer to implement the individual devices according to the present embodiment, a special-purpose electronic circuit may be used to configure the devices. According to this aspect, the program serves as a material for generating a wiring diagram for the electronic circuit or for generating a timing diagram or the like. In such an aspect, an electronic circuit satisfying specifications defined in the program is configured with, for example, a field-programmable gate array (FPGA) or an application-specific integrated circuit (ASIC). Such electronic circuits serve as a special-purpose device fulfilling functions defined in the program.

Figure 1:
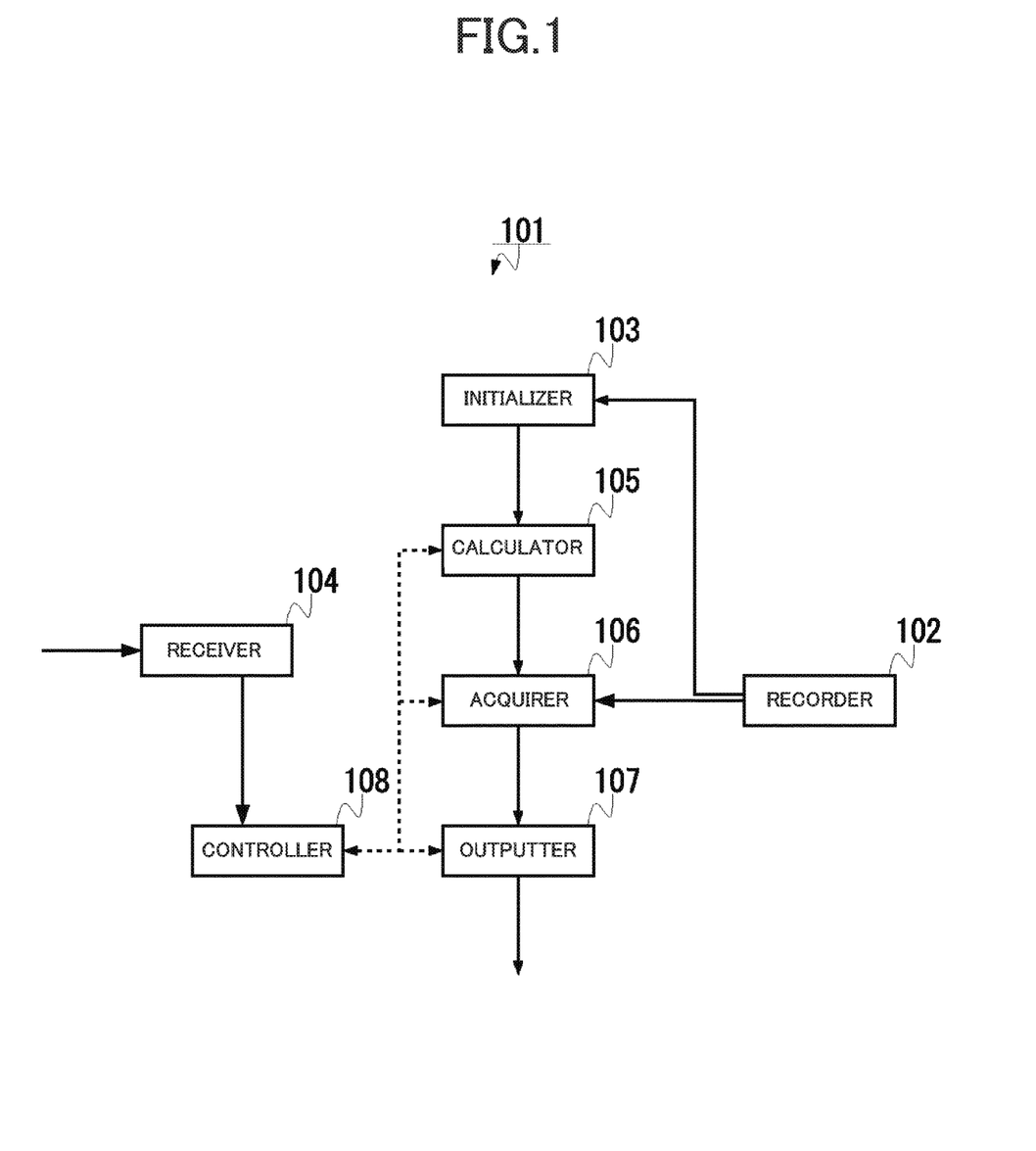
FIG. 1 is an explanatory diagram illustrating a general configuration of a search device according to the present embodiment.

FIG. 1 is an explanatory diagram illustrating a general configuration of the search device according to the present embodiment. As illustrated in the figure, the search device 101 includes a recorder 102, an initializer 103, a receiver 104, a calculator 105, an acquirer 106, an outputter 107, and a controller 108. These individual components are implemented by the processor or CPU executing codes or instructions associated with their respective functions as included in the program. The following provides a general description of functions of the individual components.

The recorder 102 records a text file to be searched. Media that can be used as the recorder 102 include a non-volatile recording medium such as a hard disk, a volatile recording medium such as RAM, and a network storage connected via a computer communication network.

The initializer 103, which is implemented by the processor or CPU, performs initialization for starting a search.

The receiver 104, which is implemented by an input device like a keyboard or mouse, or some other terminal connected via a computer communication network, receives a pattern to be used for the search.

The calculator 105, which is implemented by the processor or CPU, calculates a middle position for a binary search.

The acquirer 106, which is implemented by the processor or CPU in collaboration with the recorder 102, acquires a middle line from the middle position in a text file.

The outputter 107, which is implemented by the processor or CPU, determines whether the acquired middle line matches the pattern and, if the middle line matches the pattern, outputs the line as a search result.

The controller 108, which is implemented by the processor or CPU, controls narrowing a search range to iterate a search, based on whether a key included in the acquired middle line is greater or less than the pattern.

Operations of the search device 101 will now be described in detail. For ease of understanding, the following description assumes that the initial element of a data string is given the index 0 (0-origin). However, the numbering starting from the index 1 (1-origin) can also be used for the following embodiments by converting indices as appropriate.

A substring having a length n starting from a position p in a data string s is denoted as s (p, p+n). A higher one and a lower one of values a, b are denoted as max (a, b) and min (a, b), respectively.

Figure 2:
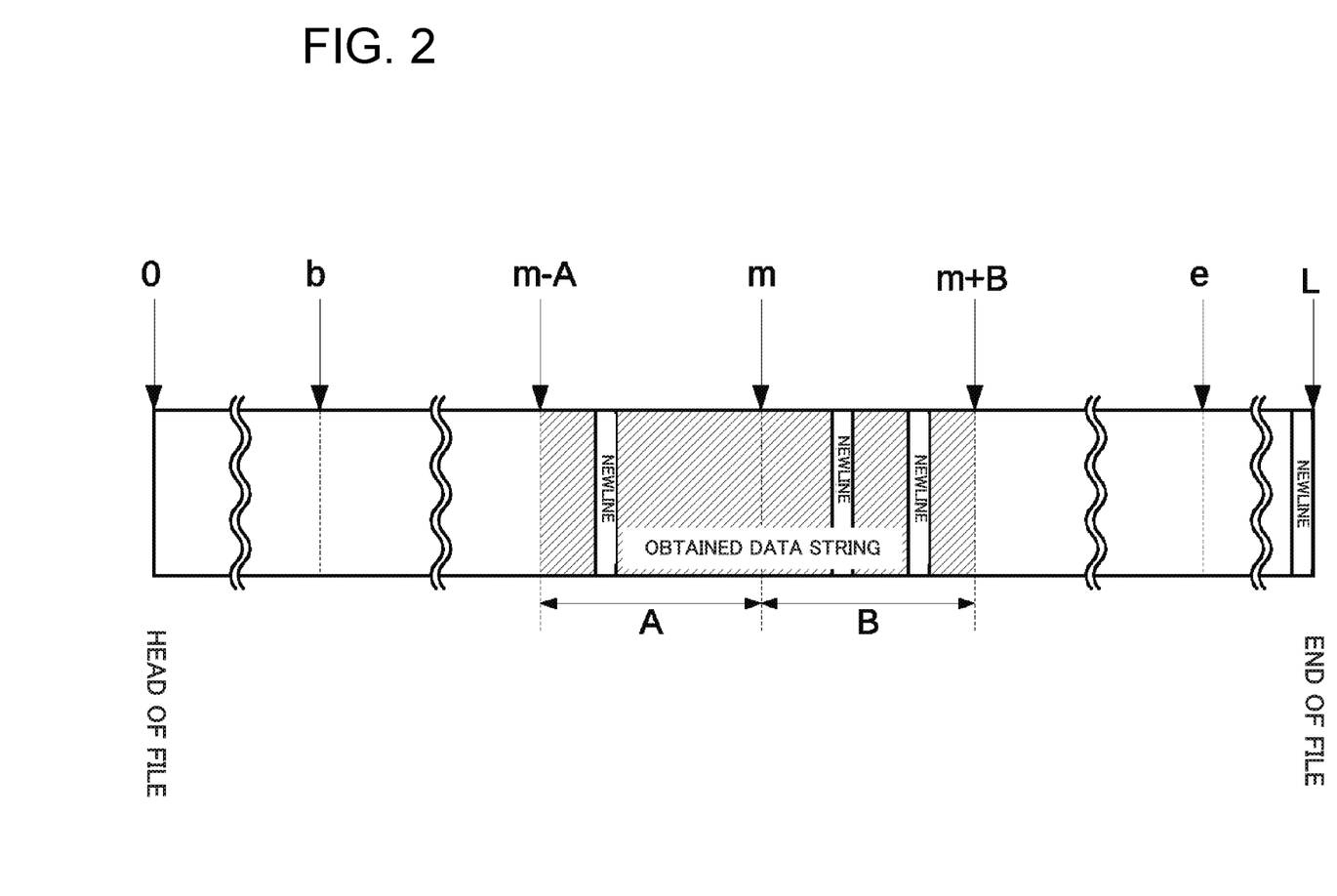
FIG. 2 is an explanatory diagram illustrating specifics of a text file f to be searched.

FIG. 2 is an explanatory diagram illustrating specifics of a text file f to be searched. The following description is given referring to this figure.

In the present embodiment, a text file to be searched contains an array of lines, each of which ends with a newline. From every line, a key such as a character string representing date and time, for example, can be extracted, and the plurality of lines is arranged in an order according to the keys.

A typical example of the text file may be a log file that is created in the character-separated values (CSV) format using a tab or comma to separate values for expressing a single record in a single line, and that contains a character string representing date and time placed in a particular field (the head field, for example). In such a log file, every time an event to be monitored occurs, a line indicating the date and time and the description of that event is added to the end of the log file. Accordingly, the lines are arranged in the order of date and time of the event without the need for an additional sorting process.

Note that the binary search of the present embodiment is not limited to log files but may be applied to any text file as long as each line ends with a newline, a key can be extracted from each line, and all the lines are sorted in an order according to the keys.

The whole length of data strings f included in a text file is hereinafter denoted as L. Note that the unit of data (a single element in a data string) differs depending on the character encoding used in a file. For example, in the case of ASCII, UTF-8, EUC, or Shift-JIS, the unit of data is 1 byte (8 bits) because a single character is expressed with 1 to 3 bytes.

In the case of UTF-16, the unit of data is 2 bytes (16 bits) because a single character is expressed with 2 or 4 bytes. In the case of UTF-32, the unit of data is 4 bytes (32 bits).

A data string representing a newline is hereinafter denoted as nl, and the length of nl is hereinafter denoted as # nl. In an operating system (OS) such as UNIX (a registered trademark), a newline nl has a length of 1 and a value of 10 representing a line feed (nl=[10], #nl=1). In a disk operating system (DOS) or Windows (a registered trademark), a newline nl has a length of 2 and a value of 13 representing a carriage return, followed by a value of 10 (nl=[13, 10], nl=2). The newline nl can be defined in a similar manner for other file systems that use any character encoding.

In the present embodiment, a text file f in whole is not read into memory but part of the file is obtained. For this purpose, data having a length of (A+B) is read out by referring to parameters: predecessor length A and successor length B.

Figure 3:
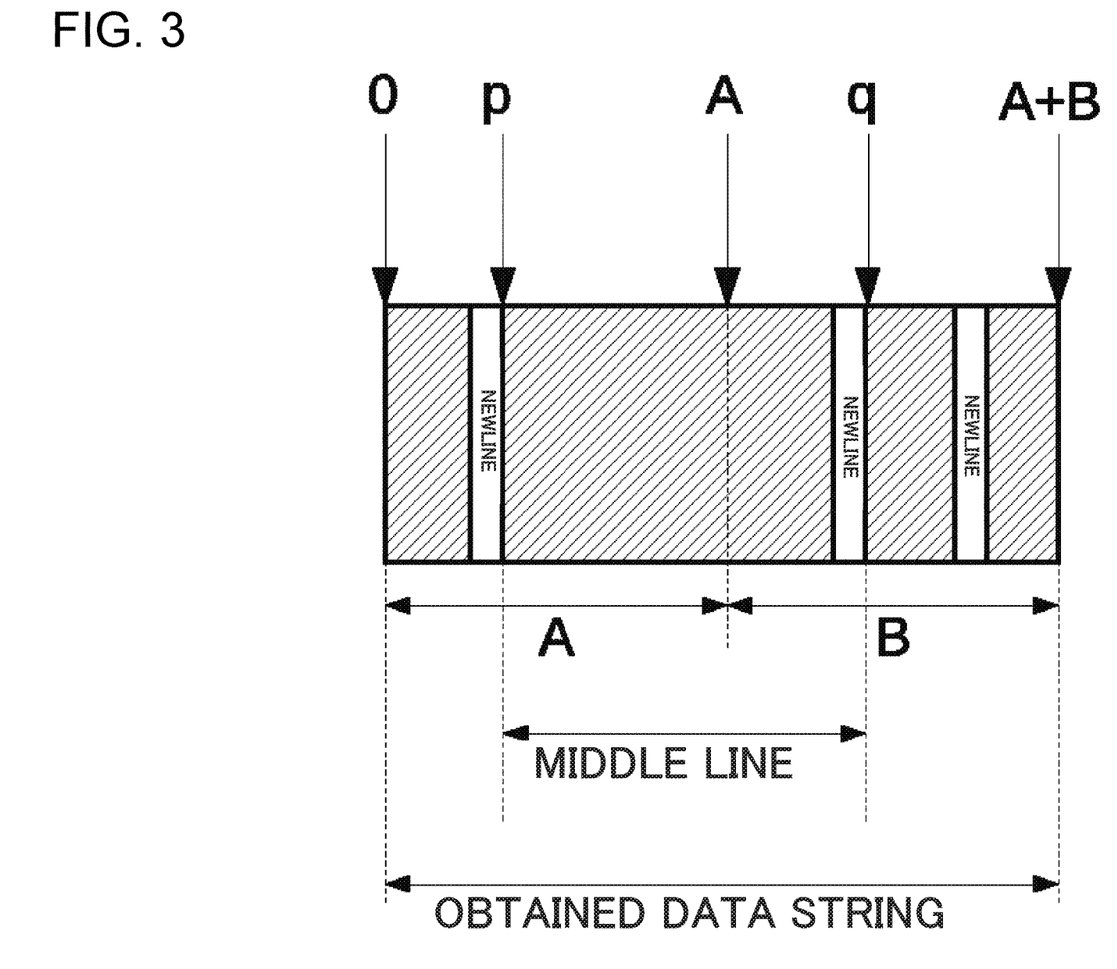
FIG. 3 is an explanatory diagram illustrating specifics of a data string z read out from a middle position m of the text file f to be searched.

FIG. 3 is an explanatory diagram illustrating specifics of a data string z read out from the middle position m of the text file f to be searched. As illustrated in the figure, the predecessor length A and the successor length B are determined such that a data string read out from the text file includes at least the whole of one line (hereinafter called a "middle line") and that the middle line starts within the predecessor length A and ends within the successor length B, or starts at the head of the successor length B and ends within the successor length B.

A maximum length of a line included in a text file f is hereinafter denoted as X. It is assumed that the maximum length X includes the length of a newline placed at the end of a line.

Figure 4:
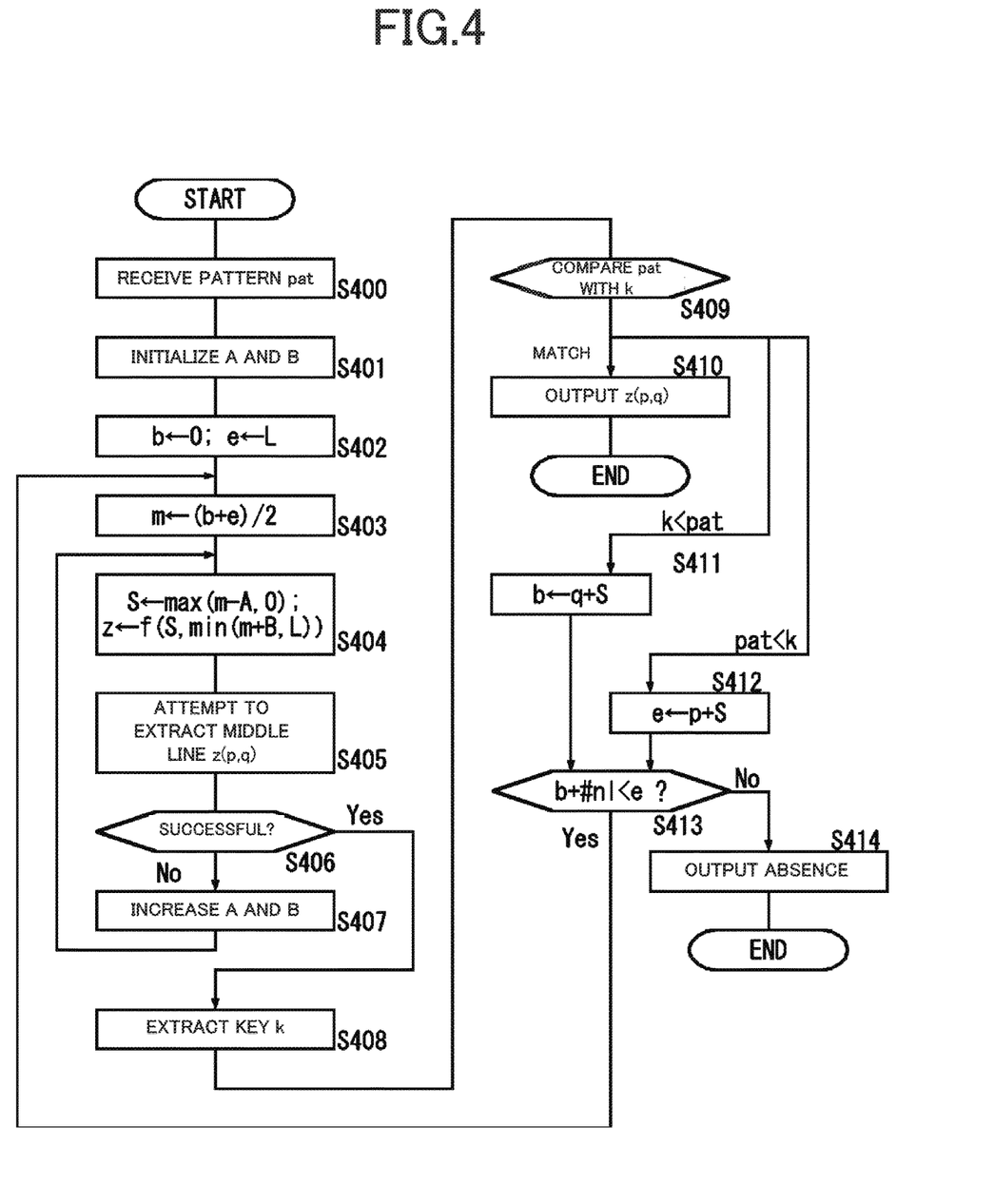
FIG. 4 is a flowchart illustrating a control flow of a process of searching for a single line that matches a pattern.

FIG. 4 is a flowchart illustrating a control flow of a process of searching for a single line that matches a pattern. The following description is given referring to this figure.

When the process is started, the search device 101 receives information indicating a text file f to be searched and a pattern pat to be used for the search (step S400).

Next, the search device 101 initializes a predecessor length A and a successor length B (step S401).

In the case where just one data piece, which is a newline at the end, of the middle line in the data string as acquired above is protruding from the predecessor length A into the successor length B, in order to detect the head of the middle line, the newline at the end of the line preceding the middle line needs to be read into the predecessor length A. Thus, the predecessor length A may be initialized as below. The symbol "←" hereinafter signifies assignment or setting.

$$A \leftarrow X + \#nl - 1$$

In contrast, initialization of the successor length B only needs considering the case where the middle line starts at the head of the successor length B and ends within the successor length B. This is because the newline at the end of the line preceding the middle line should be read into the predecessor length A. Thus, the successor length B may be initialized as follows.

$$B \leftarrow X$$

Since #nl≥1 is satisfied in general, A≥B holds. Thus, the predecessor length A may be used as both the predecessor length A and the successor length B, instead of providing the successor length B separately from the predecessor length A.

In the present embodiment, the binary search refers to a lower limit b and an upper limit e of the search range, as with binary searches in conventional arts. Initial values of the lower limit b and the upper limit e are the head position and the end position of a text file f, respectively. Letting L be a value representing the length of a text file f expressed in the unit of data, the search device 101 sets initial values of the lower limit b and the upper limit e as follows (step S402).

$$b \leftarrow 0;$$

$$e \leftarrow L$$

The length L of a text file f can be obtained by using, for example, a stat system call to get the byte count of the text file f and then dividing the byte count by the aforementioned number of bytes per unit data.

Now, iterations of binary search are started as described below. First, the search device 101 determines the middle position m such that the following is satisfied (step S403).

$$b \leq m < e$$

Typically, m is determined as below.

$$m \leftarrow (b+e)/2$$

Note that any remainder left after the integer division denoted as a slash "/" is discarded.

In many cases, the middle position m of a text file f is not at the head of a line. In other words, a middle line cannot be obtained by reading data from the middle position m of a text file f. Thus, it is impossible to perform a binary search by merely applying a conventional art.

For this reason, in the present embodiment, a data string located in the middle position m is obtained by referring to the predecessor length A and the successor length B to acquire a middle line therefrom.

From the file f, the search device 101 obtains a data string z located around the middle position m, which is the center of the section from b to e (step S404). As illustrated in FIG. 2, z may be set as below in most cases.

$$z \leftarrow f(m-A, m+B)$$

In general, z may be set as follows in view of the case where m is positioned near the head 0 or the end L of a file.

$$z \leftarrow f(\max(m-A,0), \min(m+B,L))$$

For ease of understanding, S is hereinafter used as below.

$$S \leftarrow \max(m-A, 0)$$

Then, z is expressed as follows.

$$z \leftarrow f(S, \min(m+B, L))$$

A data string z can be obtained by, for example, using an open system call to open a text file f, and then using a seek system call to set the read location to S (or a value obtained by multiplying S by the unit of data), followed by using a read system call to read data pieces, the number of which is min(m+B, L)−S, into memory.

Alternatively, when an mmap system call is used to map a text file f to a memory space, the memory address to which the file is mapped may be set to the head of the data string z.

Next, the search device 101 extracts a middle line z(p, q) from the read out data string z, the middle line z being located in the middle position m in the original text file f, that is, in the position m−S in the data string z. As described above, FIG. 3 is an explanatory diagram illustrating specifics of the data string z read out from the middle position m of the text file f to be searched. The following description is given referring to this figure.

Since this figure assumes that S=max(m−A, 0)=m−A, the position m−S is equal to the position A.

The middle line z(p, q) corresponds to f(p+S, q+S) in the original file f.

$$z(p,q) = f(p+S, q+S)$$

Note that the parameters p and q representing the head position and the end position, respectively, of a middle line z(p, q) to be extracted from the data string z satisfy all of the four conditions below.

$$0 \leq p \leq m-S < q;$$

$$z(p-\#nl, p) = nl, \text{ or } S = 0 = p;$$

$$z(q-\#nl, q) = nl;$$

$$\forall_{r|p \leq r < (q-\#nl)} z(r, r+\#nl) \neq nl$$

These p and q and the middle line z(p, q)=f(p+S, q+S) can be found by scanning the data string z from its head.

In this way, a middle line z(p, q)=f(p+S, q+S) located in a middle position m can be extracted without fail by setting a predecessor length A and a successor length B based on a maximum length X in a text file f to obtain a data string z. This is a distinct feature of the present embodiment.

The search device 101 may identify the maximum length X every time the text file f is updated. However, in the case where the text file f is assumed to be a log file, it may often be difficult to pre-check the maximum length X of a line because the text file f may be updated anytime. FIG. 4 shows a flow of control for such cases.

Accordingly, the following steps can be carried out:

(1) any valid initial values are given to the predecessor length A and the successor length B prior to start of the search (step S401);

(2) after a data string z is read out (step S404), an attempt to extract a middle line z(p, q) is made (step S405);

(3) when the extraction fails (No in step S406), A and B are increased by, for example, adding or multiplying a positive constant or scanning the text file f itself to re-identify the maximum length X (step S407); and (4) the control returns to (2) above to repeat the process of reading a data string z and making an attempt to extract a middle line z(p, q).

As described above, A and B may be different values or may be equal values. For example, the predecessor length A may be set to be used as both the predecessor length A and the successor length B, thereby saving memory and reducing calculations.

Values of A and B, once increased, may be held in memory or recorded in a non-volatile recording device or medium, such as a hard disk, and then used as initial values of A and B for the subsequent searches. Initial values of A and B as held or recorded may be specific to each text file for may be shared by text files f.

When a middle line z(p, q) is extracted successfully (Yes in step S406), the search device 101 extracts a key k from the acquired middle line z(p, q) (step S408) and checks the key k against a pattern pat (step S409).

If the key k and the pattern pat match (MATCH in step S409), the search device 101 outputs, as (one of the) search results, either the middle line z(p, q)=f(p+S, q+S) or the head position p+S and the end position q+S of the middle line z(p, q) in the original file (step S410).

For a most simple match of the key extracted from the middle line and the pattern used for a search, an exact match of a data string may be performed. Alternatively, a prefix match may be performed to find a match between the key and the pattern.

For example, in an environment where dates and times are recorded in a log file in units of microseconds, a key "2015-02-26T19:24:25.193+00:00", which uses Greenwich Mean Time for time zones, matches in its leading part the following patterns: "2015" (an event occurring in 2015), "2015-02" (an event occurring in February in the year), "2015-02-26" (an event occurring on February 26 in the year), "2015-02-26T19" (an event occurring at 7 p.m. on the day), "2015-02-26T19:24" (an event occurring at 19:24 on the day), "2015-02-26T19:24:25" (an event occurring at 19:24:25 on the day), and "2015-02-26T19:24:25.193" (an event occurring at 19:24:25.193 on the day), and thus prefix matches are found between the key and these patterns. Therefore, the key can be treated as a key matching these patterns.

Whether a key is greater or less than a pattern can be determined in a way similar to comparison of character strings. For example, each of the patterns "2015", "2015-02", "2015-02-26", "2015-02-26T19", "2015-02-26T19:24", and "2015-02-26T19:24:25", is less than the key "2015-02-26T19:24:25.193+00:00".

In general, either an exact match or a prefix match may be used depending on the intended use of a match between a key and a pattern, and the so-called lexicographical order by which data strings are compared from the head in code order may be used for determining whether a key is greater or less than a pattern.

As described above, the following holds.

$$b \leq m < e;$$

$$p+S \leq m < q+S$$

Hence, the following is always satisfied.

$$b < q+S,$$

$$p+S < e$$

If the key k in the extracted middle line z(p, q)=f(p+S, q+S) is less than the desired pattern pat (k<pat in step S409), which means the desired line is present after the middle line, the search device 101 updates the lower limit b as follows (step S411):

$$b \leftarrow q+S$$

thus narrowing the search range to a range following the middle line f(p+S, q+S), and moves the control forward to step S413. The above relational expression ensures that the update increases the lower limit b.

On the other hand, if the key k in the extracted line z(p, q)=f(p+S, q+S) is greater than the desired pattern pat (pat<k in step S409), which means the desired line is present before the middle line, the search device 101 updates the upper limit e as follows (step S412):

$$e \leftarrow p+S$$

thus narrowing the search range to a range preceding the middle line f(p+S, q+S), and moves the control forward to step S413. The above relational expression ensures that the update decreases e.

Then, the search device 101 compares the lower limit b with the upper limit e (step S413). If the comparison result is either b<e (not illustrated) or b+#nl<e, which reflects that a newline is included in any desired middle line (Yes in step S413), the search device 101 returns the control to step S403 to repeat the above-described processing.

Otherwise (No in step S413), the search device 101 outputs a result to the effect that no line in the text file f matches the desired pattern pat (step S414) and exits the process.

As seen above, the present embodiment makes it possible to perform a binary search on a text file that includes lines whose lengths are not always identical to find a line having a desired key.

Example 2

The foregoing example is described with the assumption that a text file includes only one line that matches a pattern. The following describes the case where a text file may include a plurality of successive lines that matches a pattern.

For ease of understanding, the process of "searching a text file f from position x to position y to find a single line that matches a desired pattern pat" in the foregoing example is denoted as below.

search($f,x,y,pat$)

Since the foregoing example uses 0 and L for initial values of b and e, respectively, the process is equivalent to executing search(f, 0, L, pat).

When a matching line is found by executing search(f, x, y, pat), search(f, x, y, pat) outputs the head position s and the end position t of the matching line in the file f, as well as outputting the upper limit e and the lower limit b of the search range in which the matching line has been found. This is denoted as below.

OK($b,s,t,e$)=search($f,x,y,pat$)

Obviously, x≤b≤s<t≤e≤y holds.

In relation to the foregoing example, this operation is described as follows: search(f, 0, L, pat) is executed and, if any middle line z(p, q) matching a pattern pat is found, OK(b, p+S, q+S, e) is output.

If no matching line is found, search(f, x, y, pat) returns a result to that effect. This is denoted as below.

FAIL=search($f,x,y,pat$)

Figure 5:
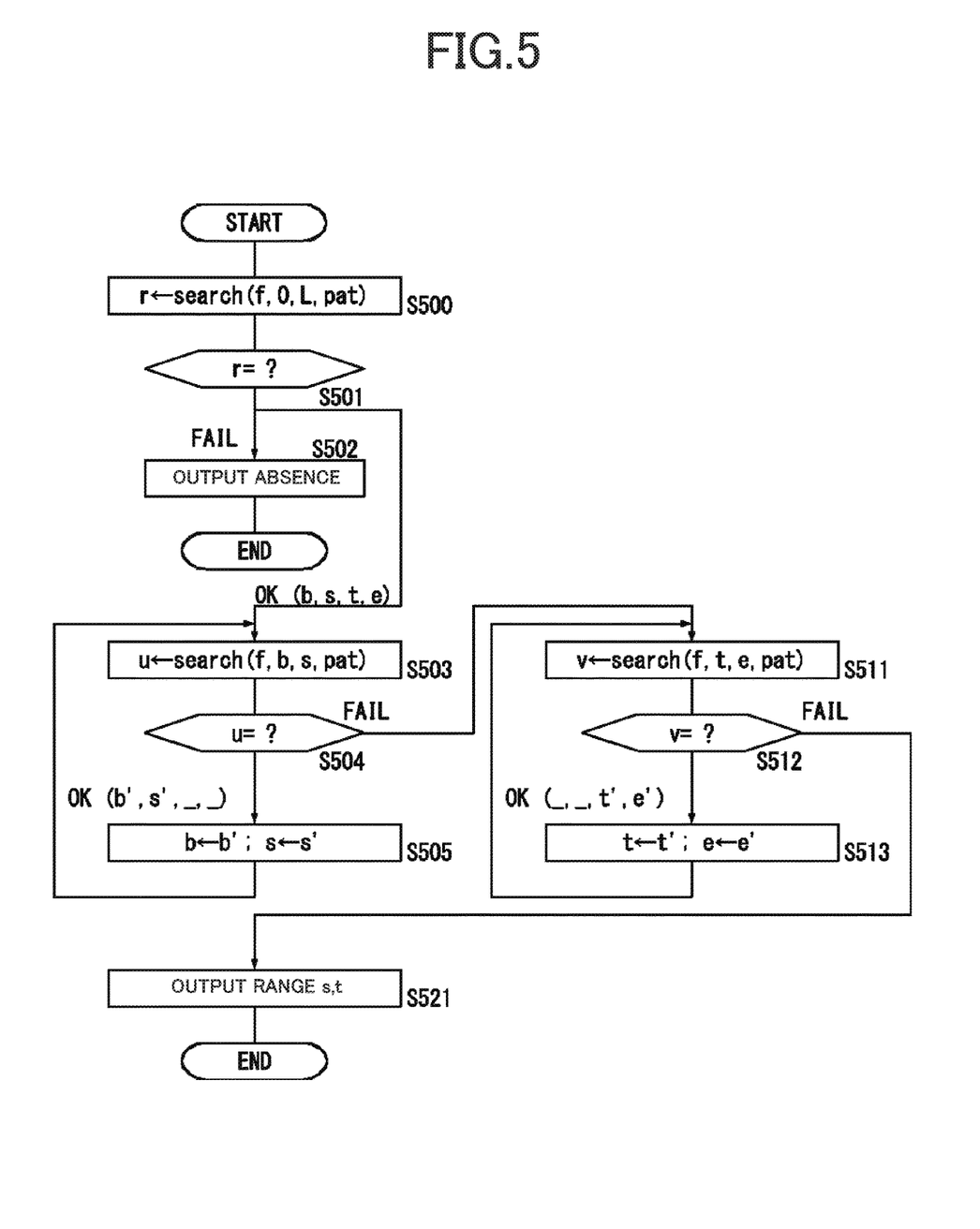
FIG. 5 is a flowchart illustrating a control flow of a process of searching for a range of lines that match a pattern.

FIG. 5 is a flowchart illustrating a control flow of a process of searching for a range of lines that match a pattern. The following description is given referring to this figure.

First, the search device 101 uses the above-described process to find a single line matching a pattern pat and obtains the search result r (step S500). In other words, the search device 101 executes the following.

$r$←search($f,0,L,pat$)

Next, the search device 101 examines the contents of r (step S501). If r=FAIL (FAIL in step S501), which means absence of any line matching the pattern pat, the search device 101 outputs a result to that effect (step S502) and exits the process.

On the other hand, if r=OK(b, s, t, e) (OK(b, s, t, e) in step S501), the search device 101 executes the process of searching the preceding range (step S503).

$u$←search($f,b,s,pat$)

Then, the search device 101 examines the contents of u (step S504). If u=FAIL (FAIL in step S504), which means the position s is at the head of the front line among the lines that match the pattern pat, the search device 101 moves the control forward to step S511.

On the other hand, if u=OK(b', s',_,_)(OK(b', s',_,_) in step S504), the search device 101 executes:

$b$←$b'$;

$s$←$s'$ to move the search range forward (step S505), and returns the control to step S503. Note that the underscore "_" signifies that the corresponding part in the result returned by the search( ) process is ignored.

Once the head position s of the front line among the lines that match the pattern pat is found, the end position of the last line among the lines that match the pattern pat can also be found; furthermore, all the matching lines can be obtained by scanning the file f from the head position s.

The following describes the process of searching for an end position. That is, the process of searching backward:

$v$←search($f,t,e,pat$)

is executed based on r=OK(b, s, t, e) as described above (step S511).

Then, the search device 101 examines the search result v (step S512). If v=FAIL (FAIL in step S512), which means the position t is at the end of the last line among the lines that match the pattern pat, the search device 101 outputs the head position s and the end position t, and exits the process (step S521).

If v=OK(_,_,t',e')(OK(_,_,t', e') in step S512), which indicates the further need for searching the subsequent range, the search device 101 executes the process (step S513):

$t$←$t'$;

$e$←$e'$ and returns the control to step S511.

In this way, binary search can be used to find, in a text file f, the head position and the end position of one or more lines as a whole that match a pattern pat.

SUMMARY

As described above, a search device according to the present embodiment includes:

a recorder recording a text file that includes an array of a plurality of lines sorted in an order of keys, each of the keys being included in each of the plurality of lines, each of the lines including a newline placed at an end of the line;

a receiver configured to receive a pattern for performing a search;

an initializer configured to set a head position and an end position of the text file to a lower limit and an upper limit of a search range;

a calculator configured to make calculation of a middle position between the lower limit and the upper limit;

an acquirer configured to make acquisition of, from the text file recorded in the recorder, a middle line that:
  (x) starts at or before the calculated middle position; and
  (y) ends after the calculated middle position;

an outputter configured to output, when a key included in the acquired middle line matches the received pattern, the acquired middle line as a result of the search; and a controller configured to:
  (p) re-set the head position of the middle line to the lower limit when the key included in the acquired middle line is greater than the received pattern;
  (q) re-set the end position of the middle line to the upper limit when the key included in the acquired middle line is less than the received pattern; and
  repeat the calculation by the calculator and the acquisition by the acquirer when the position shifted backward from the upper limit by a length of one newline comes before the lower limit, wherein the outputter outputs, if the position shifted backward from the upper limit by the length of one newline does not come before the lower limit, a result of the search to an effect that a line matching the received pattern is not found.

In the search device according to the present embodiment, the initializer may be configured to:

initialize a predecessor length and a successor length to a first initial value and a second initial value, and the acquirer may be configured to:
  read from the recorder a data piece that:
    (a) starts at a position shifted forward from the calculated middle position by the predecessor length or at the head of the text file; and (b) ends at a position shifted backward from the calculated middle position by the successor length or at the end of the text file;
make an attempt to acquire the middle line from the read data piece; and
increase, when the attempt to acquire the middle line fails, the predecessor length and the successor length and re-attempt to acquire the middle line.

In the search device according to the present embodiment, the predecessor length and the successor length effective when the middle line has been acquired may be used as the first initial value and the second initial value for a next search.

In the search device according to the present embodiment, the initializer may be configured to:
(1) set the predecessor length to a value equal to or greater than a value obtained by subtracting 1 from a sum of a maximum length among the plurality of lines and a length of a newline; and
(2) set the successor length to a value equal to or greater than the maximum length among the plurality of lines, and
the acquirer may be configured to:
read from the recorder a data piece that:
(a) starts at a position shifted forward from the calculated middle position by the predecessor length or at the head of the text file; and
(b) ends at a position shifted backward from the calculated middle position by the successor length or at the end of the text file; and
acquire the middle line from the read data piece.

In the search device according to the present embodiment, when the acquirer fails to acquire the middle line, the maximum length may be identified by scanning the text file.

In the search device according to the present embodiment, the maximum length may be identified every time the text file is updated.

A search method according to the present embodiment is a method for searching a recorder recording a text file that includes an array of a plurality of lines sorted in an order of keys, each of the keys being included in each of the plurality of lines, each of the lines including a newline placed at an end of the line, the method including:
a reception step of receiving a pattern for performing a search, the reception being performed by a search device;
an initialization step of setting a head position and an end position of the text file to a lower limit and an upper limit of a search range, the initialization being performed by the search device;
a calculation step of making calculation of a middle position between the lower limit and the upper limit, the calculation being performed by the search device;
an acquisition step of making acquisition of, from the text file recorded in the recorder, a middle line that:
(x) starts at or before the calculated middle position; and
(y) ends after the calculated middle position,
the acquisition being performed by the search device;
an output step of outputting, when a key included in the acquired middle line matches the received pattern, the acquired middle line as a result of the search, the output being performed by the search device; and
a control step of:
(p) re-setting the head position of the middle line to the lower limit when the key included in the acquired middle line is greater than the received pattern, the re-setting being performed by the search device;
(q) re-setting the end position of the middle line to the upper limit when the key included in the acquired middle line is less than the received pattern, the re-setting being performed by the search device; and
repeating the calculation step and the acquisition step when the position shifted backward from the upper limit by a length of one newline comes before the lower limit, the repeating being performed by the search device,
wherein the search device outputs, if the position shifted backward from the upper limit by the length of one newline does not come before the lower limit, a result of the search to an effect that a line matching the received pattern is not found.

A program according to the present embodiment causes a computer that includes:
a recorder recording a text file that includes an array of a plurality of lines sorted in an order of keys, each of the keys being included in each of the plurality of lines, each of the lines including a newline placed at an end of the line;
to function as:
a receiver configured to receive a pattern for performing a search;
an initializer configured to set a head position and an end position of the text file to a lower limit and an upper limit of a search range;
a calculator configured to make calculation of a middle position between the lower limit and the upper limit;
an acquirer configured to make acquisition of, from the text file recorded in the recorder, a middle line that:
(x) starts at or before the calculated middle position; and
(y) ends after the calculated middle position;
an outputter configured to output, when a key included in the acquired middle line matches the received pattern, the acquired middle line as a result of the search; and
a controller configured to:
(p) re-set the head position of the middle line to the lower limit when the key included in the acquired middle line is greater than the received pattern;
(q) re-set the end position of the middle line to the upper limit when the key included in the acquired middle line is less than the received pattern; and
repeat the calculation by the calculator and the acquisition by the acquirer when the position shifted backward from the upper limit by a length of one newline comes before the lower limit,
wherein the outputter outputs, if the position shifted backward from the upper limit by the length of one newline does not come before the lower limit, a result of the search to an effect that a line matching the received pattern is not found.

In the present embodiment, the program may be recorded in a non-transitory computer-readable information recording medium, the program being configured to:
be loaded into a memory included in the computer; and
be executed by a processor included in the computer,
wherein the program may include:
a reception code causing the processor to function as the receiver;
an initialization code causing the processor to function as the initializer;
a calculation code causing the processor to function as the calculator;
an acquisition code causing the processor to function as the acquirer; and
a control code causing the processor to function as the controller, and wherein the lower limit, the upper limit, the middle position, the middle line, and a result of the search may be stored in the memory.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure achieves providing a search device, a search method, a program, and an information recording medium for performing a binary search on a text file.

REFERENCE SIGNS LIST

101 Search device
102 Recorder
103 Initializer
104 Receiver
105 Calculator
106 Acquirer
107 Outputter
108 Controller

The invention claimed is:

1. A search device comprising:
a storage medium recording a text file that includes an array of a plurality of lines sorted in an order of keys, middle of the keys being included in each of the plurality of lines, each of the lines including a newline placed at an end of the line;
a computer input device configured to receive a pattern for performing a search;
at least one memory configured to store computer program code;
at least one processor configured to read said computer program code and operate as instructed by said computer program code, said computer program code including:
initializer code configured to cause at least one of said at least one processor to set a head position and an end position of the text file to a lower limit and an upper limit of a search range;
calculator code configured to cause at least one of said at least one processor to make calculation of a middle position between the lower limit and the upper limit;
acquirer code configured to cause at least one of said at least one processor to make acquisition of, from the text file recorded in the recorder, a middle line that:
(x) starts at or before the calculated middle position; and
(y) ends after the calculated middle position;
outputter code configured to cause at least one of said at least one processor to output, when a key included in the acquired middle line matches the received pattern, the acquired middle line as a result of the search; and
controller code configured to cause at least one of said at least one processor to:

(p) decrease the upper limit when the key included in the acquired middle line is greater than the received pattern, wherein the decreased upper limit is determined based on the head position of the middle line;
(q) increase the lower limit when the key included in the acquired middle line is less than the received pattern, wherein the increased lower limit is determined based on the end position of the middle line; and
repeat the calculation by the calculator code and the acquisition by the acquirer code based on the upper limit being greater than a sum of the lower limit and a length of one newline,
wherein the outputter code causes at least one of said at least one processor to output, based on the upper limit being equal to or less than the sum of the lower limit and the length of one newline, a result of the search to an effect that a line matching the received pattern is not found, and
wherein the initializer code is configured to cause at least one of said at least one processor to initialize a predecessor length and a successor length to a first initial value and a second initial value, and
wherein the acquirer code is configured to cause at least one of said at least one processor to read from the recorder a data piece that:
(a) starts at a position before the calculated middle position by the predecessor length or at the head of the text file; and
(b) ends at a position after the calculated middle position by the successor length or at the end of the text file;
make an attempt to acquire the middle line from the read data piece; and
increase, when the attempt to acquire the middle line fails, the predecessor length and the successor length and re-attempt to acquire the middle line.

2. The search device according to claim 1,
wherein the predecessor length and the successor length effective when the middle line has been acquired are used as the first initial value and the second initial value for a next search.

3. A search device comprising:
a storage medium recording a text file that includes an array of a plurality of lines sorted in an order of keys, middle of the keys being included in each of the plurality of lines, each of the lines including a newline placed at an end of the line;
a computer input device configured to receive a pattern for performing a search;
at least one memory configured to store computer program code;
at least one processor configured to read said computer program code and operate as instructed by said computer program code, said computer program code including:
initializer code configured to cause at least one of said at least one processor to set a head position and an end position of the text file to a lower limit and an upper limit of a search range;
calculator code configured to cause at least one of said at least one processor to make calculation of a middle position between the lower limit and the upper limit;
acquirer code configured to cause at least one of said at least one processor to make acquisition of, from the text file recorded in the recorder, a middle line that:

(x) starts at or before the calculated middle position; and (y) ends after the calculated middle position;

outputter code configured to cause at least one of said at least one processor to output, when a key included in the acquired middle line matches the received pattern, the acquired middle line as a result of the search; and controller code configured to cause at least one of said at least one processor to:

(p) decrease the upper limit when the key included in the acquired middle line is greater than the received pattern, wherein the decreased upper limit is determined based on the head position of the middle line;

(q) increase the lower limit when the key included in the acquired middle line is less than the received pattern, wherein the increased lower limit is determined based on the end position of the middle line; and repeat the calculation by the calculator code and the acquisition by the acquirer code based on the upper limit being greater than a sum of the lower limit and a length of one newline, wherein the outputter code causes at least one of said at least one processor to output, based on the upper limit being equal to or less than the sum of the lower limit and the length of one newline, a result of the search to an effect that a line matching the received pattern is not found, and wherein the initializer code is further configured to cause at least one of said at least one processor to:

(1) set a predecessor length to a value equal to or greater than a value obtained by subtracting 1 from a sum of a maximum length among the plurality of lines and a length of a newline; and (2) set a successor length to a value equal to or greater than the maximum length among the plurality of lines, and wherein the acquirer code is further configured to cause at least one of said at least one processor to:

read from the recorder a data piece that:

(a) starts at a position before the calculated middle position by the predecessor length or at a head of the text file; and (b) ends at a position after the calculated middle position by the successor length or at an end of the text file; and acquire the middle line from the read data piece.

4. The search device according to claim 3, wherein, when the acquirer code fails to cause at least one of said at least one processor to acquire the middle line, a maximum length is identified by scanning the text file.

5. The search device according to claim 3, wherein a maximum length is identified every time the text file is updated.

6. A method performed by at least one computer processor, for searching a recorder recording a text file that includes an array of a plurality of lines sorted in an order of keys, each of the keys being included in each of the plurality of lines, each of the lines including a newline placed at an end of the line, the method comprising:

receiving a pattern for performing a search, the reception being performed by a search device;

setting a head position and an end position of the text file to a lower limit and an upper limit of a search range, the initialization being performed by the search device;

making calculation of a middle position between the lower limit and the upper limit, the calculation being performed by the search device;

making acquisition of, from the text file recorded in the recorder, a middle line that:

(x) starts at or before the calculated middle position; and (y) ends after the calculated middle position, the acquisition being performed by the search device;

outputting, when a key included in the acquired middle line matches the received pattern, the acquired middle line as a result of the search, the output being performed by the search device; and controlling by:

(p) decreasing the upper limit when the key included in the acquired middle line is greater than the received pattern, wherein the decreased upper limit is determined based on the head position of the middle line;

(q) increasing the lower limit when the key included in the acquired middle line is less than the received pattern, wherein the increased lower limit is determined based on the end position of the middle line; and repeating the calculation and the acquisition based on the upper limit being greater than a sum of the lower limit and a length of one newline, wherein the search device outputs, based on the upper limit being equal to or less than the sum of the lower limit and the length of one newline, a result of the search to an effect that a line matching the received pattern is not found, and wherein the setting code is configured to cause at least one of said at least one processor to initialize a predecessor length and a successor length to a first initial value and a second initial value, and wherein the acquirer code is configured to cause at least one of said at least one processor to read from the recorder a data piece that:

(a) starts at a position before the calculated middle position by the predecessor length or at a head of the text file; and (b) ends at a position after the calculated middle position by the successor length or at the end of the text file;

make an attempt to acquire the middle line from the read data piece; and increase, when the attempt to acquire the middle line fails, the predecessor length and the successor length and re-attempt to acquire the middle line.

7. A non-transitory computer-readable information recording medium recording a program that when executed on a computer causes the computer to:

record a text file that includes an array of a plurality of lines sorted in an order of keys, each of the keys being included in each of the plurality of lines, each of the lines including a newline placed at an end of the line to:

receive a pattern for performing a search;

set a head position and an end position of the text file to a lower limit and an upper limit of a search range;

make calculation of a middle position between the lower limit and the upper limit;

make acquisition of, from the text file recorded in the recorder, a middle line that:
(x) starts at or before the calculated middle position; and
(y) ends after the calculated middle position;
output, when a key included in the acquired middle line matches the received pattern, the acquired middle line as a result of the search; and
control by:
(p) decreasing the upper limit when the key included in the acquired middle line is greater than the received pattern, wherein the decreased upper limit is determined based on the head position of the middle line;
(q) increasing the lower limit when the key included in the acquired middle line is less than the received pattern, wherein the increased lower limit is determined based on the end position of the middle line; and
repeating the calculation and the acquisition based on the upper limit being greater than a sum of the lower limit and a length of one newline, and
output, based on the upper limit being equal to or less than the sum of the lower limit and the length of one newline, a result of the search to an effect that a line matching the received pattern is not found, and
wherein the setter code is configured to cause at least one of said at least one processor to initialize a predecessor length and a successor length to a first initial value and a second initial value, and
wherein the acquirer code is configured to cause at least one of said at least one processor to read from the recorder a data piece that:
(a) starts at a position before the calculated middle position by the predecessor length or at the head of the text file; and
(b) ends at a position after the calculated middle position by the successor length or at the end of the text file;
make an attempt to acquire the middle line from the read data piece; and
increase, when the attempt to acquire the middle line fails, the predecessor length and the successor length and re-attempt to acquire the middle line.

8. The non-transitory computer-readable information recording medium recording the program according to claim 7, wherein the program is configured to:
be loaded into a memory included in the computer; and
be executed by a processor included in the computer,
wherein the program comprises:
reception code configured to cause the processor to receive;
initialization code configured to cause the processor to initialize;
calculation code configured to cause the processor to calculate;
acquisition code configured to cause the processor to acquire; and
control code configured to cause the processor to control, and
wherein the lower limit, the upper limit, the middle position, the middle line, and a result of the search are stored in the memory.

* * * * *